US008397085B2

(12) United States Patent
Buckey et al.

(10) Patent No.: US 8,397,085 B2
(45) Date of Patent: Mar. 12, 2013

(54) MASTER CONTROLLER CONTAINING A CONTROL PROCESSOR CONFIGURED TO RECEIVE POWER CELL CONTROL INFORMATION AND A HOST PROCESSOR CONFIGURED TO RECEIVE COMMAND AND STATUS INFORMATION

(75) Inventors: James A. Buckey, Lower Burrell, PA (US); Ralph R. Flaugher, Allison Park, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 514 days.

(21) Appl. No.: 12/235,902

(22) Filed: Sep. 23, 2008

(65) Prior Publication Data

US 2009/0083553 A1      Mar. 26, 2009

Related U.S. Application Data

(60) Provisional application No. 60/974,599, filed on Sep. 24, 2007, provisional application No. 60/974,896, filed on Sep. 25, 2007.

(51) Int. Cl.
| | | |
|---|---|---|
| *B23Q 5/10* | (2006.01) | |
| *H02M 5/275* | (2006.01) | |
| *H02J 1/10* | (2006.01) | |
| *H02J 3/00* | (2006.01) | |
| *G08B 3/00* | (2006.01) | |
| *G08B 1/08* | (2006.01) | |
| *H03K 19/173* | (2006.01) | |
| *G06F 11/00* | (2006.01) | |
| *G06F 11/30* | (2006.01) | |

(52) U.S. Cl. .......... 713/300; 318/139; 363/163; 307/18; 307/85; 340/310.12; 340/539.1; 326/38; 714/22; 713/340

(58) Field of Classification Search .................. 318/139; 363/163, 71, 65; 307/18, 85; 340/310.12, 340/636.1, 539.1; 326/38; 714/22; 700/286; 716/1; 713/340
See application file for complete search history.

(56) References Cited

U.S. PATENT DOCUMENTS

| | | | |
|---|---|---|---|
| 5,625,545 A | 4/1997 | Hammond | |
| 5,909,367 A * | 6/1999 | Change | 363/163 |
| 5,986,909 A | 11/1999 | Aiello | |
| 6,166,513 A | 12/2000 | Hammond | |
| 6,222,284 B1 | 4/2001 | Hammond et al. | |
| 7,286,906 B2 * | 10/2007 | Richards | 700/286 |
| 7,747,900 B2 * | 6/2010 | Elliott et al. | 714/22 |
| 7,760,106 B2 * | 7/2010 | Vandensande et al. | 340/636.1 |
| 7,940,537 B2 * | 5/2011 | Abolhassani et al. | 363/65 |
| 2002/0000781 A1 * | 1/2002 | Glen | 318/139 |

(Continued)

FOREIGN PATENT DOCUMENTS

| | | | |
|---|---|---|---|
| EP | 1968180 A2 * | 9/2008 | |
| JP | 2001167063 A | 6/2001 | |

(Continued)

OTHER PUBLICATIONS

Eduardo P. Wiechmann, Mulitcell High-Current Rectifier, Jan./Feb. 2008, IEEE vol. 44.*

(Continued)

*Primary Examiner* — Thomas Lee
*Assistant Examiner* — Aurel Prifti

(57) ABSTRACT

A power supply includes multiple power cells and a master control system in communication with each of the power cells. The master controller includes a control processor configured to receive power cell control information and a host in communication with the control processor wherein the host is configured to receive command and status information.

12 Claims, 4 Drawing Sheets

U.S. PATENT DOCUMENTS

| | | | |
|---|---|---|---|
| 2004/0172603 A1* | 9/2004 | Collmeyer et al. | 716/1 |
| 2005/0088201 A1* | 4/2005 | Devlin et al. | 326/38 |
| 2005/0219879 A1* | 10/2005 | Bixel | 363/71 |
| 2007/0055902 A1* | 3/2007 | Bousfield et al. | 713/340 |
| 2007/0188440 A1* | 8/2007 | Hwang et al. | 345/102 |
| 2008/0174182 A1* | 7/2008 | Hammond | 307/85 |
| 2008/0218320 A1* | 9/2008 | Jang | 340/310.12 |
| 2008/0238195 A1* | 10/2008 | Shaver et al. | 307/18 |
| 2010/0283599 A1* | 11/2010 | Ma et al. | 340/539.1 |

FOREIGN PATENT DOCUMENTS

| | | |
|---|---|---|
| JP | 2006109688 A | 4/2006 |
| WO | 2006115020 A1 | 11/2006 |

OTHER PUBLICATIONS

Samir Kouro, Multicarrier PWM . . . , Jan. 2008, vol. 23, IEEE.*
Weigmann, Multi cell High Current Rectifier, Publication 2006, IEEE.*

* cited by examiner

US 8,397,085 B2

MASTER CONTROLLER CONTAINING A CONTROL PROCESSOR CONFIGURED TO RECEIVE POWER CELL CONTROL INFORMATION AND A HOST PROCESSOR CONFIGURED TO RECEIVE COMMAND AND STATUS INFORMATION

RELATED APPLICATIONS AND CLAIM OF PRIORITY

This application claims the priority benefit of U.S. Provisional Application No. 60/974,599 filed Sep. 24, 2007, and U.S. Provisional Application No. 60/974,896 filed Sep. 25, 2007, each of which are hereby incorporated by reference.

BACKGROUND

This application discloses an invention that is related, generally and in various embodiments, to a power supply having a dual processor architecture and a method of using a power supply having a dual processor architecture.

In certain applications, high voltage, high current power supplies utilize modular power cells to process power between a source and a load. Such modular power cells can be applied to a given power supply with various degrees of redundancy to improve the availability of the power supply. A control system may be incorporated to act as an interface between a user of the power supply, the power supply itself, and any load applied to the power supply. For example, FIG. 1 illustrates various embodiments of a power supply (e.g., an AC motor drive) having nine such power cells. The power cells in FIG. 1 are represented by a block having input terminals A, B, and C; and output terminals T1 and T2. In FIG. 1, a transformer or other multi-winding device 110 receives three-phase, medium-voltage power at its primary winding 112, and delivers power to a load 130 such as a three-phase AC motor via an array of single-phase inverters (also referred to as power cells). Each phase of the power supply output is fed by a group of series-connected power cells, called herein a "phase-group".

The transformer 110 includes primary windings 112 that excite a number of secondary windings 114-122. Although primary winding 112 is illustrated as having a star configuration, a mesh configuration is also possible. Further, although secondary windings 114-122 are illustrated as having a delta or an extended-delta configuration, other configurations of windings may be used as described in U.S. Pat. No. 5,625,545 to Hammond, the disclosure of which is incorporated herein by reference in its entirety. In the example of FIG. 1 there is a separate secondary winding for each power cell. However, the number of power cells and/or secondary windings illustrated in FIG. 1 is merely exemplary, and other numbers are possible. Additional details about such a power supply are disclosed in U.S. Pat. No. 5,625,545.

Any number of ranks of power cells are connected between the transformer 110 and the load 130. A "rank" in the context of FIG. 1 is considered to be a three-phase set, or a group of three power cells established across each of the three phases of the power delivery system. Referring to FIG. 1, rank 150 includes power cells 151-153, rank 160 includes power cells 161-163, and rank 170 includes power cells 171-173. A master control system 195 sends command signals to local controls and receives status/feedback information from each cell over fiber optics or another wired or wireless communications medium 190. Similarly, communications medium 192 is used by the master control system 195 for communications with a user of the power supply. Commands may be received from the user, and any status/feedback information may be transmitted back to the user. As with communications medium 190, communications medium 192 may be fiber optics or another wired or wireless medium. It should be noted that the number of cells per phase depicted in FIG. 1 is exemplary, and more than or less than three ranks may be possible in various embodiments.

FIG. 2 illustrates various embodiments of a power cell 210 which is representative of various embodiments of the power cells of FIG. 1. The power cell 210 includes a three-phase diode-bridge rectifier 212, one or more direct current (DC) capacitors 214, and an H-bridge inverter 216. The rectifier 212 converts the alternating current (AC) voltage received at cell input 218 (i.e., at input terminals A, B and C) to a substantially constant DC voltage that is supported by each capacitor 214 that is connected across the output of the rectifier 212. The output stage of the power cell 210 includes an H-bridge inverter 216 which includes two poles, a left pole and a right pole, each with two switching devices. The inverter 216 transforms the DC voltage across the DC capacitors 214 to an AC output at the cell output 220 (i.e., across output terminals T1 and T2) using pulse-width modulation (PWM) of the semiconductor devices in the H-bridge inverter 216.

As shown in FIG. 2, the power cell 210 may also include fuses 222 connected between the cell input 218 and the rectifier 212. The fuses 222 may operate to help protect the power cell 210 in the event of a short-circuit failure. According to other embodiments, the power cell 210 is identical to or similar to those described in U.S. Pat. No. 5,986,909 and its derivative U.S. Pat. No. 6,222,284 to Hammond and Aiello, the disclosures of which are incorporated herein by reference in their entirety.

Returning to FIG. 1, the master control system 195 includes a single processor which receives operational information (voltage, current, etc.) associated with the power supply, processes the information, and based on the processed information, generates commands to control the operation of the power supply.

In many applications, users and/or owners of a given power supply utilize information associated with the power supply to control the operation of one or more systems external to the power supply, and also utilize information associated with the one or more systems to control the operation of the power supply. For such implementations, the processor receives and processes the operational information associated with the power supply, as well as the information associated with the one or more systems external to the power supply.

For some of such applications, the single processor can still provide real time control of the power supply. However, for other applications in which there is a requirement of processing and providing of more external information, the single processor is limited in the amount of data that can be processed and provided while still maintaining real time control of the power supply.

SUMMARY

In one general respect, this application discloses a power supply. The power supply includes multiple power cells and a master control system in communication with each of the power cells. The master controller includes a control processor configured to receive power cell control information and a host in communication with the control processor wherein the host is configured to receive command and status information.

In another general respect, this application discloses a method for controlling a power supply, the method including receiving drive information at a first processor of the power supply, generating a first control command based on the power cell control information, receiving command and status information at a second processor of the power supply, generating an instruction based on the command and status information, communicating the instruction to the first processor and generating a second control command based on the instruction.

DESCRIPTION OF THE DRAWINGS

Various embodiments of the invention are described herein by way of example in conjunction with the following figures.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 1:
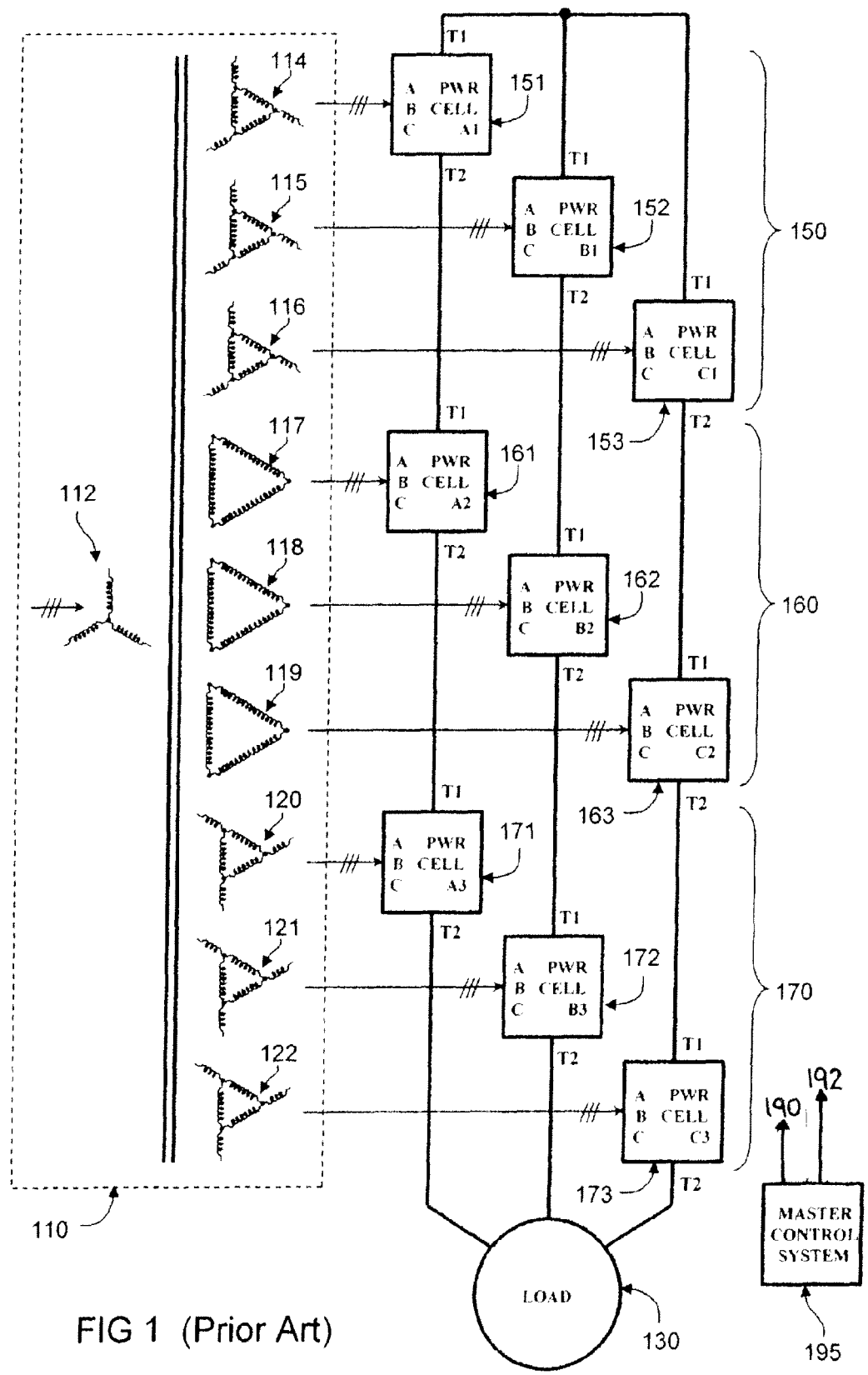
FIG. 1 illustrates various embodiments of a power supply.
Figure 2:
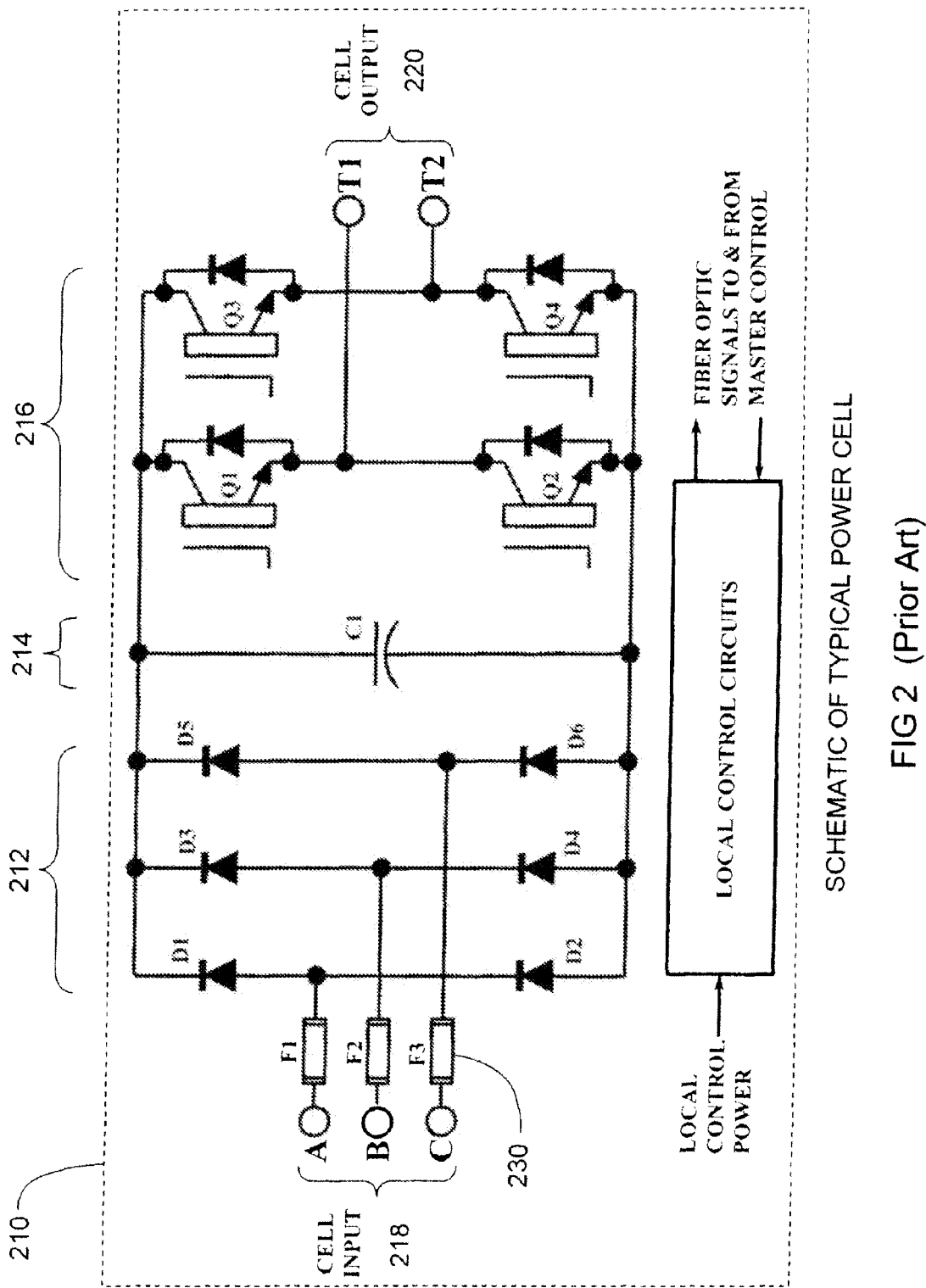
FIG. 2 illustrates various embodiments of a power cell of the power supply of FIG. 1.
Figure 3:
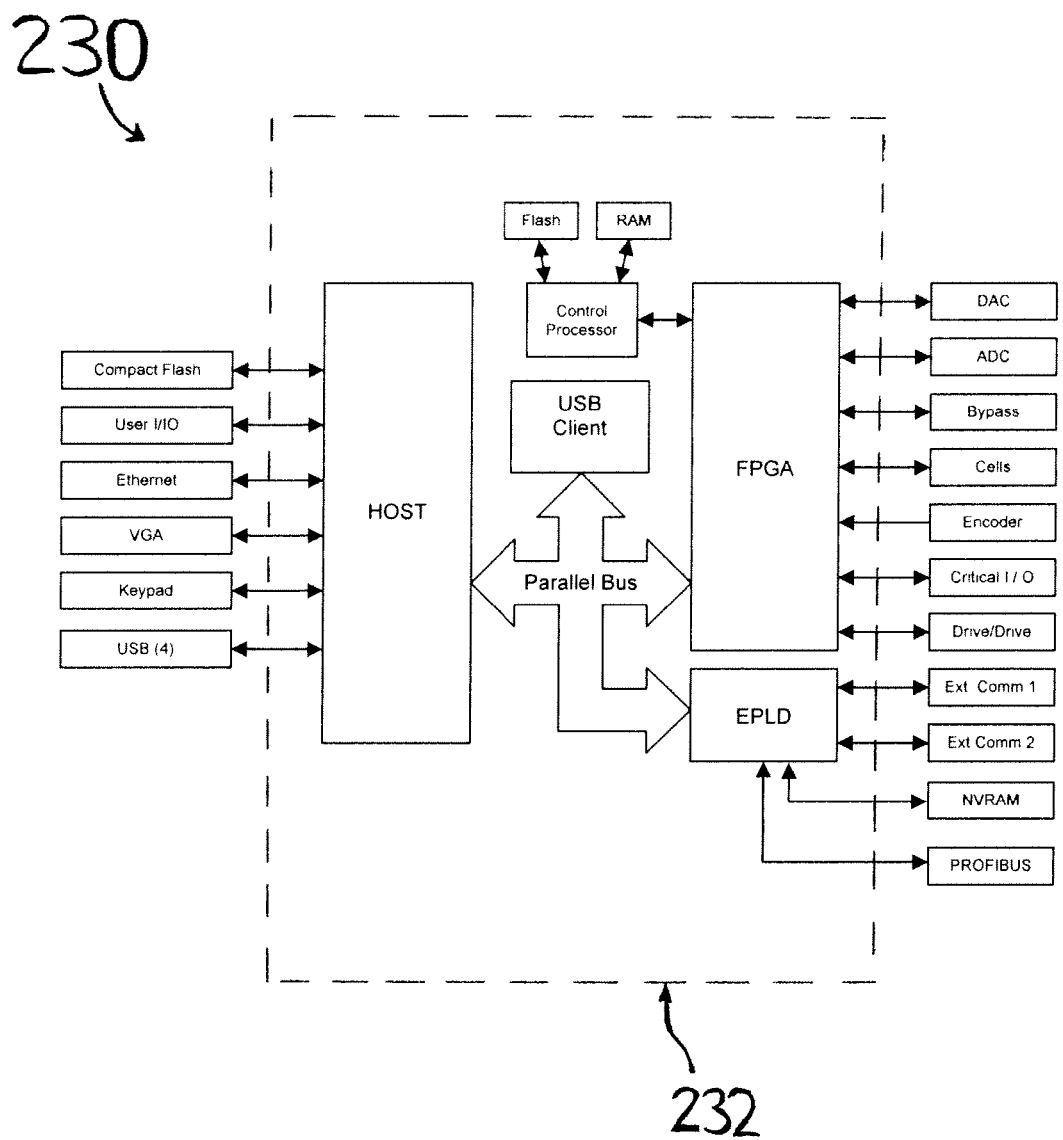
FIG. 3 illustrates various embodiments of a power supply having a dual processor architecture.

FIG. 3 illustrates various embodiments relating to a master control system in a power supply 230. The power supply 230 is similar to the multi-cell power supply of FIG. 1, but includes a different master control system 232 that overcomes the limitations of a single processor based system. As shown in FIG. 3, the master control system 232 includes a field programmable gate array (FPGA), a control processor in communication with the FPGA, an electrically programmable logic device (EPLD), and a host. The master control system 232 also includes a parallel bus, and the FPGA, the EPLD, and the host are each connected to the parallel bus.

According to various embodiments, the FPGA is RAM-based and is configured for communication with one or more digital-to-analog converters (DAC), one or more an analog-to-digital converters (ADC), a power cell bypass system (Bypass), a plurality of power cells (Cell), an encoder, one or more input/output interfaces (Critical I/O), and an internal network (Drive/Drive).

The digital-to-analog converter may be utilized to convert selected digital signals to analog signals. The one or more analog-to-digital converters may be utilized to convert various analog signals (e.g., voltage amplitudes, current amplitudes, cell temperatures, etc.) to digital signals. The power cell bypass system may be utilized to bypass one or more failed power cells of the power supply 230. Each power cell of the power supply 230 sends operating information to the FPGA, and receives operation commands via the FPGA. The encoder is associated with a motor (e.g., a motor being driven by the power supply), converts the rotary motion or position of the motor to a code of electronic pulses, and communicates the electronic pulses to the FPGA. The one or more input/output interfaces may be embodied, for example, as switches, potentiometers, etc., and allows a user and/or owner of the power supply 230 to define how the power supply 230 fits into a larger system. The internal network may be utilized to facilitate the interconnection of multiple power supplies.

Collectively, the information to or from the DAC, each ADC, the power cell bypass system, each power cell, the encoder, each input/output interface, and the internal network may be considered "drive" information. This drive information may include specific information related to power cell control. In operation, the FPGA performs logic operations on the received drive information, then passes the resultant information to the control processor. The control processor receives the resultant information, processes the resultant information, and based on the processed information, generates operational commands which are passed to the FPGA for distribution to the appropriate interfaces (e.g., an interface to a given ADC, an interface to a given power cell, etc.). Essentially, the FPGA handles internal housekeeping and unique communications to the appropriate interfaces. The control processor may be embodied as a digital signal processor, and together with the FPGA, provides functionality to control the load (e.g., a motor). As shown in FIG. 3, the control processor may be configured for communication with flash memory and/or random access memory (RAM).

According to various embodiments, the EPLD is in communication with one or more communication modules (e.g., Network 1, Network 2, etc.), a memory device (NVRAM), and one or more ASCII serial devices (e.g., MODBUS, PROFIBUS, etc.). The EPLD is embodied as a flash device. The communication modules may be utilized to allow the power supply to communicate using standard communication protocols. The memory device is a non-volatile memory device, and may be utilized to store information (e.g., parameters, history, etc.) which the user and/or owner do not want to be lost when power is lost. The one or more serial interfaces allows the EPLD to communicate over a variety of different field buses.

According to various embodiments, the host includes a processor mounted to a printed circuit board. The host is configured for communication with a compact flash device, a user I/O interface, an Ethernet interface, a video graphics array (VGA) interface, a keypad interface, and one or more USB interfaces. Collectively, the respective interfaces may be considered "non-drive" interfaces. Collectively, any information received from these interfaces may be considered "non-drive" information or command and status information.

The compact flash device may be utilized to store programs executed by the host. The user I/O may allow a user to request and/or provide information to the host. Such information may include, for example, a status query, configuration of power supply parameters, log information, etc. The Ethernet interface may be embodied as, for example, an RJ45 Ethernet connector, and may be utilized to allow the host to communicate with a device connected thereto. The VGA interface may be embodied as, for example, a DB 15 video connector, and may be utilized to drive a given display connected thereto. The keypad interface may be embodied as, for example, an RS485 interface, and may be utilized to allow the host to communicate with a keypad connected thereto. The one or more USB interfaces may be utilized to allow the host to communicate with one or more devices connected thereto. For example, according to various embodiments, the host may utilize the USB interfaces to communicate with a USB mouse, a USB keyboard, a USB jump drive, etc.

In operation, the host receives and/or provides the command and status information, executes system programs, controls the non-drive interfaces, controls the modules/devices connected to the EPLD, and communicates information to the control processor via the parallel bus and the FPGA. The information provided to the control processor may subsequently result in the control processor generating an operation command which produces a change in the operation of the power supply. Such information may include for example, an indication of the number of power cells in the power supply 230, an indication of how many power cells can be bypassed, an instruction to change the acceleration of a motor connected to the power supply 230 when the motor reaches a particular speed, etc. In contrast to the control processor, the host does not provide motor control functionality.

According to various embodiments, as shown in FIG. 3, the master control system 232 may further include a universal serial bus (USB) client connected to the parallel bus. The USB client may be utilized to interface tools which run on a separate personal computer connected thereto. For example, a field service technician may utilize the USB client to interface diagnostic tools to the master control system 232.

Figure 4:
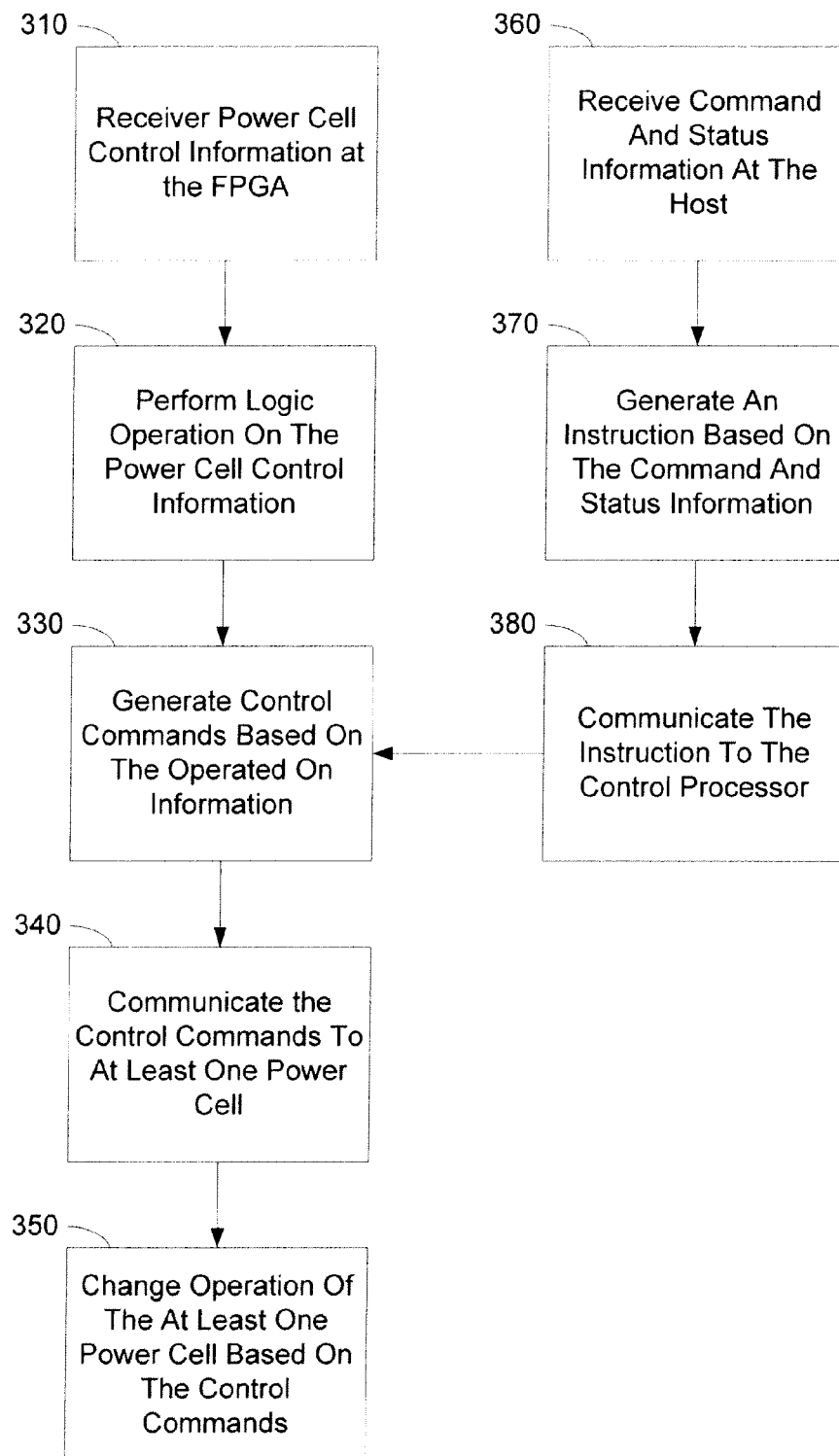
FIG. 4 illustrates various embodiments of a method for controlling a power supply.

FIG. 4 illustrates various embodiments of a method 300 for controlling a power supply. For purposes of simplicity, the method 300 will be described in the context of its use with the power supply 230.

The process begins at block 310, where power cell control (or "drive") information is received by the FPGA. From block 310, the process advances to block 320, where the FPGA performs a logic operation on the power cell control information and communicates the operated on power cell control information to the control processor. From block 320, the process advances to block 330, where the control processor processes the operated on power cell control information, and generates a control command based thereon. From block 330, the process advances to block 340, where the control command is communicated to a power cell via the FPGA. From block 340, the process advances to block 350, where the power cell receives the control command, and changes its operation based thereon.

From block 350, the process advances to block 360, where the host receives command and status (or "non-drive") information. From block 360, the process advances to block 370, where the host processes the command and status information, and generates an instruction based on the processed command and status information. From block 370, the process advances to block 380, where the instruction is communicated to the control processor via the parallel bus and the FPGA. From block 380, the process advances to block 330 where the same process as discussed above with respect to blocks 330, 340 and 350 repeats. A control command is generated at block 330 based upon the command and status information. According to various embodiments, the second control command may simply be a modification of the control command generated at block 330 based upon the power cell control information, or may be an entirely different control command. From block 330, the process advances to block 340, where the second control command is communicated to at least one power cell via the FPGA. From block 340, the process advances to block 350, where the at least one power cell receives the second control command, and changes its operation based thereon.

Although the method 300 is described in the context of a sequential process, it will be appreciated that the described sequence may vary, and some steps of the process may be performed concurrently and/or simultaneously. For example, when the FPGA is receiving the power cell control information at block 310, the host may also be receiving the command and status information at block 360.

Therefore, while several embodiments of the invention have been described herein by way of example, those skilled in the art will appreciate that various modifications, alterations, and adaptions to the described embodiments may be realized without departing from the spirit and scope of the invention defined by the appended claims.

What is claimed is:

1. A system comprising:
 a plurality of power cells; and
 a master control system in communication with each of the power cells, wherein the master control system comprises:
  a control processor configured to receive power cell control information and to generate first operating commands;
  a host in communication with the control processor, wherein the host is configured to receive command and status information and generate at least one instruction based upon the command and status information, the at least one instruction configured to instruct the control processor to generate second operating commands;
  a field programmable gate array in communication with the control processor, the plurality of power cells and the host, wherein the field programmable gate array is configured to:
   receive the power cell control information from each of the plurality of power cells,
   transmit the power cell control information to the control processor, and
   receive the first operating commands and the second operating commands from the control processor for distribution to the plurality of power cells;
  a parallel bus connected to the host and the field programmable gate array; and
  an electronically programmable logic device connected to the parallel bus.

2. The system of claim 1, wherein the field programmable gate array is configured to distribute the operation commands to an appropriate interface.

3. The system of claim 2, wherein the appropriate interface includes at least one of a digital-to-analog converter, an analog-to-digital converter, a power cell bypass, at least one power cell, an encoder, an input/output interface, and an internal network.

4. The system of claim 1, wherein the electronically programmable logic device is configured to communicate with at least one of a communication module, a memory device, and one or more serial devices.

5. The system of claim 4, wherein the electronically programmable logic device is configured to communicate over a variety of different field buses via the one or more serial devices.

6. The system of claim 1, wherein the electronically programmable logic device is configured to communicate with the host.

7. The system of claim 1, wherein the host is configured to communicate with at least one or a compact flash device, a user input/output interface, an Ethernet interface, a video graphics array interface, a keypad interface, and one or more universal serial bus interfaces.

8. A method for controlling a power supply, the method comprising:
 receiving drive information at a first processing device of the power supply and transferring the drive information to a second processing device of the power supply;

generating, by the second processing device, a first control command based on the control information, wherein the first control command changes an operation of at least one power cell;

receiving command and status information related to the at least one power cell at a third processing device of the power supply;

generating, by the third processing device, an instruction based on the command and status information;

communicating, by the third processing device, the instruction to the second processing device;

generating, by the second processing device, a second control command for the at least one power cell based on the instruction; and distributing, by the first processing device, the first control command and the second control command to a plurality of power cells.

9. The method of claim 8, wherein receiving the drive information comprises receiving the control information via a field programmable gate array of the power supply.

10. The method of claim 8, wherein communicating the instruction comprises communicating the instruction from a host processor of the power supply to a field programmable gate array of the power supply.

11. The method of claim 8, further comprising communicating at least one of the following to a power cell of the power supply:
- the first control command generated based upon the received control information; and
- the second control command generated based on the received command and status information wherein the second command is at least one of an update to the first command or an entirely new command.

12. The method of claim 11, further comprising changing the operation of the power cell.

* * * * *